United States Patent [19]
Willett

[11] 3,765,772
[45] Oct. 16, 1973

[54] INTERFEROMETRIC ANGULAR SENSOR AND REFERENCE

[75] Inventor: Colin S. Willett, Keedysville, Md.

[73] Assignee: The United States of America as represented by the Secretary of the Army, Washington, D.C.

[22] Filed: June 30, 1972

[21] Appl. No.: 267,884

[52] U.S. Cl. ................................ 356/110, 356/112
[51] Int. Cl. ............................................. G01b 9/02
[58] Field of Search 356/106–113, 138; 331/94.5 C

[56] References Cited
UNITED STATES PATENTS
3,224,323  12/1965  Chitayat.............................. 356/110
3,470,377  9/1969  LeFevre et al...................... 356/138

OTHER PUBLICATIONS
Principles of Optics, Born & Wolf; Pergamon Press 1965, pgs. 291–292.

Primary Examiner—David Schonberg
Assistant Examiner—Conrad Clark
Attorney—Harry M. Saragovitz et al.

[57] ABSTRACT

An interferometric angular movement sensor which maintains a stable alignment of a surface with respect to a reference plane. The sensor relies upon the formation of non-localized circular fringes formed in reflection from two reflective surfaces, one of which is positioned in the reference plane and the other of which is mounted on the surface sought to be maintained in angular relationship with said reference plane. The fringes are formed as a result of directing divergent light from a source onto the two reflective surfaces. The position of the fringes on an appropriately located screen detector will indicate whether any misalignment has occurred, and by connecting said detector to appropriate servo-mechanisms, realignment of the two surfaces can be easily maintained to a degree of accuracy heretofore unobtainable.

10 Claims, 4 Drawing Figures

PATENTED OCT 16 1973

3,765,772

SHEET 1 OF 2

INTERFEROMETRIC ANGULAR SENSOR AND REFERENCE

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

This invention relates to opto-electronic devices which maintain a stable condition relative to a reference, and more particularly, to an interferometric technique for doing same.

2. Description of the Prior Art

Since the advent of precisely balanced machinery and equipment capable of achieving very close tolerances, a problem has existed in trying to maintain a stable level condition of such machinery relative to some reference. Some of the prior art level detectors require manual sighting adjustment and frequently can be leveled in one direction only. The same holds true of electronic devices which also tend to be less accurate and more expensive than their mechanical counterparts. Examples of the prior art in this field include the following U.S. Pat. Nos.: 2,446,096; 3,464,276; 2,567,310; and 3,569,716. Most of this prior art utilizes the common technique of combination photo-electric sensors and light sources which are directed towards one another across a tube or container partially filled with fluid. A tilt in the device will increase or decrease the amount of light reaching the photo-sensitive element to activate servo-control mechanisms to bring the device back to a level condition. This has the inherent disadvantage of a time lag in response, and close dimensional tolerances are required for the placement of the fluid and the placement of the photo-sensitive detectors and light sources in order to achieve the desired results. Commonly used switching devices, such as mercury switches, create instabilities when a high degree of accuracy and sensitivity is necessary.

It is therefore a primary object of the present invention to provide an angular movement sensor which is capable of sensing a small angular change in tilt in the plane on which the sensor lies that was heretofore unobtainable.

An additional object of the present invention is to provide an angular movement sensor that utilizes the physical phenomenon of the interferometric formation of non-localized circular fringes.

Another object of the invention is to provide an angular movement sensor which is inexpensive, simple to construct, and does not require close dimensional tolerances in order to achieve a high degree of accuracy.

A further object of the invention is to provide a level sensing device which can be easily adapted to a servo-control system for maintaining a stable level condition in both the level and cross-level directions.

Still another object of the invention is to provide an angular movement sensor that provides a sensitivity to angular alignment akin to that of a Fabry-Perot interferometer.

SUMMARY OF THE INVENTION

Briefly, in accordance with the invention, an interferometric angular movement sensor is provided for detecting the angular displacement of a surface with respect to a reference plane. The sensor comprises a pair of relative coatings, one of which is located in the reference plane, the second of which faces the first and forms a side of the surface sought to be maintained in a stable angular relationship to the reference plane. Divergent light, such as that from a laser, is projected onto the reflective coatings. The interference between the light reflected at the first coating and light that has been refracted at the first coating and reflected at the second coating forms non-localized circular interference fringes. The non-localized fringes can be detected on a quadrant detector that will sense a change in position of the fringes should the angle between the two reflective coatings change. This change in position of the fringes can be transmitted from the quadrant detector to servo-control systems that will bring the two surfaces into the desired angular relationship. A plurality of such coatings and light soures and detectors can be utilized on a single object to maintain its angular relationship with respect to a plurality of reference planes.

BRIEF DESCRIPTION OF THE DRAWING

The specific nature of the invention as well as other objects, aspects, uses and advantages thereof will clearly appear from the following description and from the accompanying drawing, in which.

DESCRIPTION OF THE PREFERRED EMBODIMENT

Figure 1:
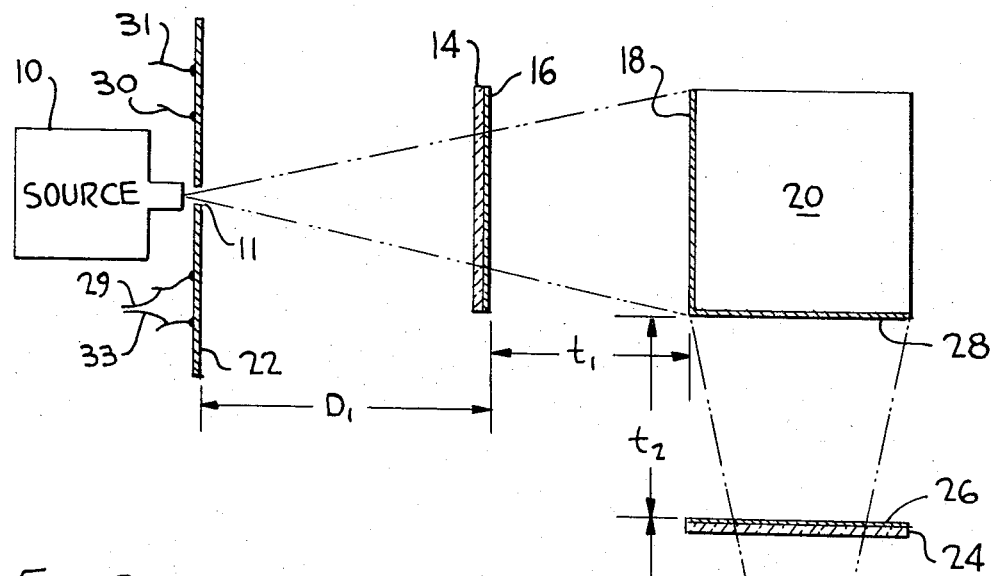
FIG. 1 is a diagrammatic sketch illustrating a preferred embodiment of the device of the present invention.
Figure 2:
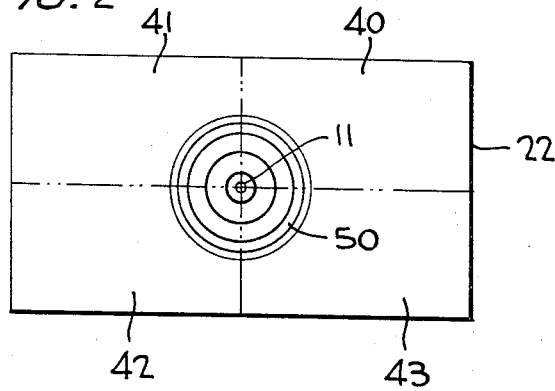
FIG. 2 illustrates the formation of the interference fringes on the detector of the system of the present invention when the surfaces are in alignment.

FIG. 1 illustrates the angular movement sensor in a preferred embodiment form. The embodiment shown in FIG. 1 is designed to detect angular movement of reference block 20 in the $x$, $y$ and $z$ directions. This is accomplished by virtue of the dual system along both axes which consists of reflective surfaces 18 and 28 located on block 20, thin glass plates 14 and 24 having metallized partially reflecting surfaces 16 and 26, respectively, facing reflective surfaces 18 and 28, detectors 22 and 32, and light sources 10 and 12 which project divergent light through the apertures 11 and 13 of screens 22 and 32, respectively. It is seen that reflective surface 16 is located a distance $t_1$ from reflective surface 18 and a distance $D_1$ from detection screen 22. Likewise, on the y-axis, reflective surface 26 is located a distance $t_2$ away from reflective surface 28 and a distance $D_2$ away from detection screen 32. Detectors 22 and 32 are preferably in the form of quadrant detectors, as is illustrated in FIG. 2 which shows detector 22 to be divided into four quadrants 40, 41, 42 and 43. Each of the quadrants has a wire leading therefrom to appropriate servo-mechanisms (not shown) that are well known in the art. For quadrant detector screen 22 the wires are designated 29, 30, 31 and 33; whereas for quadrant detector screen 32, the wires are indicated at 34, 35, 36 and 37.

Figure 3:
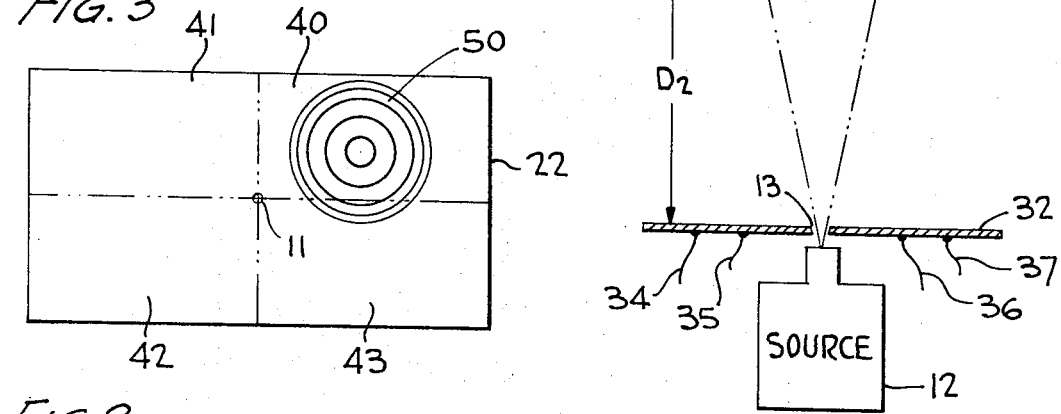
FIG. 3 illustrates the fringes formed by the present invention when the two surfaces are misaligned.

We need only consider one of the two perpendicular systems shown in order to understand the operation and the basic principles underlying the present invention. Divergent light from source 10, which may be produced by a laser or an incoherent source focussed through aperture 11, produced non-localized circular fringes in reflection on screen 22 as a result of interference produced by reflections between the reflective coatings 16 and 18. Because the fringes are non-localized, they can be observed easily on screen 22 without the need for optics for focussing. This phenomenon should not be confused with Newton's rings, which are similar in appearance but are localized and can only be projected onto a screen with an optical system. The fringes in this technique diverge as cones from behind block 20 and do not need optics for their projection onto screen 22. The circular fringes formed on screen 22, if reflective coating 16 is parallel to reflective coating 18, will be centered on aperture 11 as shown by the fringes 50 in FIG. 2. If coating 18 tilts with respect to coating 16, the center of the fringe pattern will move as is illustrated in FIG. 3. This movement of the fringe pattern 50 produces an out of balance signal from the quadrant detectors on the face of screen 22. This out of balance signal can be utilized to control a self-leveling servo-control system. The system on the y-axis of FIG. 1 works much in the same way. Any angular movement between coatings 26 and 28 will produce an out of balance signal upon detector 32 as a result of movement of the non-localized circular interference fringe pattern which can then be utilized to servo-control the angular relationship between coatings 26 and 28.

Figure 4:
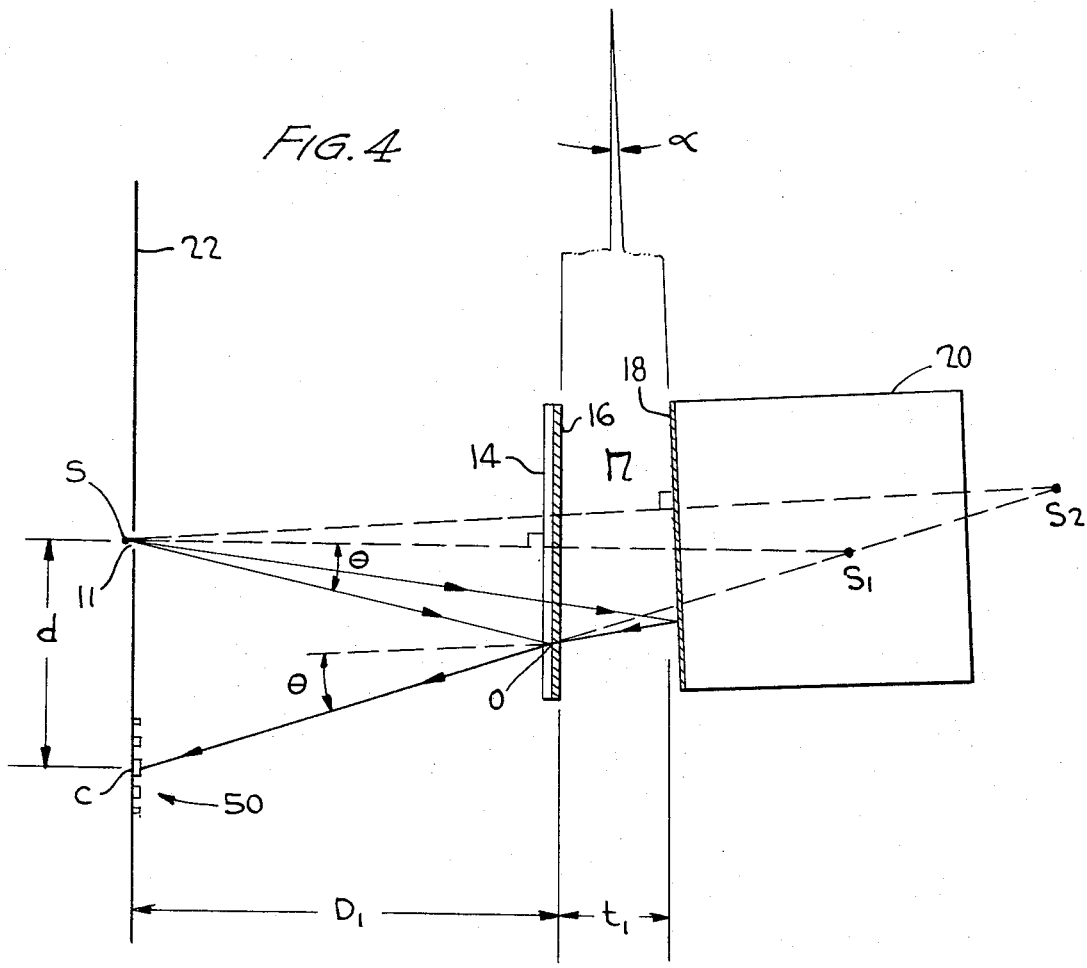
FIG. 4 is a sketch which is helpful in understanding the relationships presented below with respect to the device of the present invention.

The physical relationships and quantitative analysis of the foregoing interferometric technique can perhaps be better understood with reference to FIG. 4 that illustrates the formation of the center of the circular non-localized fringe pattern when the two surfaces 16 and 18 are disposed at an angle $\alpha$ with respect to one another. FIG. 4 illustrates how the two beam non-localized circular fringes 50 are formed in reflection by interference from two virtual sources $S_1$ and $S_2$. The two virtual sources $S_1$ and $S_2$ are images of the source S formed by reflection in the reflective coatings 16 and 18. The wedge angle $\alpha$ between surfaces 16 and 18 is given by the simple relationship $$\alpha = (t_1 \theta / n^2 D_1) \quad (1)$$

where $t_1$ is the average distance between surfaces 16 and 18, $n$ is the generalized refractive index between the two surfaces, $D_1$ is the distance between surface 16 and screen 22, and $\theta$ is one-half the angle SOC between aperture 11, the incident point on screen 16, and the center C of the circular fringe system on screen 22. Thus, it can easily be seen that if surfaces 16 and 18 tilt with respect to each other by the angle $\alpha$ the center C of the fringe pattern will move by an angle $$\theta = \alpha D_1 n^2 / t_1 \quad (2)$$

It is this movement that will produce the out of balance signal necessary to activate the servo-control system to bring surfaces 16 and 18 back into alignment with one another. A more complex derivation of the foregoing equation can be found in Vol. 10, No. 9 of Applied Optics in an article entitled Measurement of Parallelism of the Surfaces of a Transparent Sample Using Two-Beam Non-Localized Fringes Produced by a Laser, at p. 2107 (Sept. 1971).

If surfaces 16 and 18, and surfaces 26 and 28 of FIG. 1 do not move angularly with respect to each other, but merely alter their separation $t_1$ and $t_2$, respectively, an out of balance signal will not be obtained since the circular fringes remain circular and just disappear or appear out of the center of the fringe pattern (analogous to Fabry-Perot fringes). Note that for complete definition of the angular movement of reference block 20, detectors are only needed for the sides shown, as angular movement of those two sets of planes also involves angular movement of the other surfaces. This system has the sensitivity to angular alignment of a Fabry-Perot interferometer. With small separations of $t_1$ and $t_2$ of about 1 millimeter, and a screen to block distance of 10 centimeters, the angular movement between surfaces 16 and 18, or between surfaces 26 and 28, will be multiplied 100 times. If $t_1$ and $t_2$ are 0.1 millimeter, the angular movement will be multiplied by one thousand, and the system will respond to angular movements of less than 0.2 arc-seconds.

The surfaces 16, 18, 26 and 28 have reflective coatings on them of about 70 percent reflectivity which will give good intense sharp circular fringes upon screens 22 and 32. Because of the non-localized nature of the fringes, the system is not sensitive to vibration, does not require optics to produce focussing, and requires no moving part other than the servo-control mechanisms not shown.

I wish it to be understood that I do not desire to be limited to the exact details of construction shown and described, for obvious modifications will occur to a person skilled in the art.

I claim as my invention:

1. An interferometric angular movement sensor for detecting the angular displacement of a surface with respect to a reference plane, comprising:
   a. a first reflective coating positioned in said reference plane;
   b. a second reflective coating which forms a side of the surface sought to be maintained in stable relationship to said reference plane;
   c. means for projecting divergent light onto said first and second reflective coatings such that non-localized circular interference fringes are formed as a result of interference between light reflected at said first coating and light that has been refracted at said first coating and reflected at said second coating; and
   d. means for detecting said non-localized conical interference fringes and for translating the position of said fringes on said detecting means into commands for reducing the angular misalignment between said first and second reflective coatings.

2. The invention according to claim 1 wherein said first reflective coating is mounted on a glass plate located in said reference plane such that said first reflective coating faces said second reflective coating.

3. The invention according to claim 2 wherein said detecting means comprises a quadrant detector divided into at least four sectors, each of said sectors comprising a detection screen and means for transmitting the signals detected thereon to means for realigning said surface with said reference plane.

4. The invention according to claim 3 further comprising a plurality of said sensors each having a pair of reflective coatings and its own light source such that the angular movement of a multifaceted object can be monitored.

5. A device for detecting angular displacement of a surface with respect to a reference plane comprising:
   a. a first partially reflective coating positioned in said reference plane;
   b. a second reflective coating positioned on said surface and parallel to said reference plane;
   c. means for projecting divergent light through said first coating and onto said second coating; and
   d. means for detecting non-localized conical interference fringes.

6. The device of claim 5 wherein said first and second coatings face each other.

7. The device of claim 6 wherein said means for detecting comprises a planar light detector positioned parallel to said first coating.

8. The device of claim 7 wherein said means for projecting divergent light comprises means for transmitting light through an aperture in the center of said detecting means.

9. The device of claim 7 wherein said light detector comprises a quadrant detector divided into at least four sectors.

10. The device of claim 7 further comprising means responsive to detected light for realigning said surface with respect to said reference plane.

* * * * *